United States Patent [19]

Sannomiya

[11] Patent Number: 4,773,700

[45] Date of Patent: Sep. 27, 1988

[54] BACK DOOR STRUCTURE FOR AUTOMOBILES

[75] Inventor: Masayoshi Sannomiya, Hiroshima, Japan

[73] Assignee: Mazda Motor Corporation, Hiroshima, Japan

[21] Appl. No.: 25,630

[22] Filed: Mar. 13, 1987

[30] Foreign Application Priority Data

Mar. 13, 1986 [JP] Japan .................. 61-55789

[51] Int. Cl.⁴ ............................................. B60J 5/04
[52] U.S. Cl. .................... 296/146; 296/201; 296/106; 49/502
[58] Field of Search ............ 296/56, 76, 106, 146, 296/201, 202, 1 C; 49/502

[56] References Cited

U.S. PATENT DOCUMENTS

| 2,128,679 | 8/1938 | Kielian | 296/1 C |
| 4,261,610 | 4/1981 | Inamoto et al. | 296/201 X |
| 4,341,414 | 7/1982 | Chiba | 296/146 X |

FOREIGN PATENT DOCUMENTS

| 142435 | 5/1985 | European Pat. Off. | 296/146 |
| 2574109 | 6/1986 | France | 296/146 |
| 5631917 | 8/1979 | Japan . | |
| 75213 | 6/1981 | Japan | 296/202 |
| 112316 | 9/1981 | Japan | 296/146 |
| 161612 | 9/1983 | Japan | 296/146 |
| 171714 | 9/1984 | Japan | 296/146 |

Primary Examiner—Dennis H. Pedder
Attorney, Agent, or Firm—Burns, Doane, Swecker & Mathis

[57] ABSTRACT

An automobile back door structure includes a back door body formed to include a rear window opening and pivotally attached to the rear portion of an automobile body so as to open and close the rear of the vehicle, and a window glass fixedly mounted on the back door body so as to close the rear window opening. The back door body includes outer and inner panels respectively defining outer and inner surfaces of the back door body. The outer and inner panels are joined to each other at positions where their outer peripheries and the rear window opening meet. The outer panel includes an upper portion having the rear window opening formed at the approximate center thereof and including an outer surface on which the window glass is fixedly secured, and a lower portion joined to the upper portion at a lower part thereof located below the window opening and formed to include a recess for a license at the approximate center thereof.

12 Claims, 3 Drawing Sheets

BACK DOOR STRUCTURE FOR AUTOMOBILES

BACKGROUND OF THE INVENTION

This invention relates to a back door structure mounted so as to be capable of opening the rear of an automobile body.

Conventionally, the back door of an automotive vehicle such as a hatch back-, van- or station wagon-type automobile includes a back door body formed to include an opening for a window in the upper portion thereof and provided on the rear of the automobile body so as to be capable of opening the same. A sheet of window glass is mounted in the window opening and a recess for receiving the vehicle license plate or the like is formed on the outer side of the back door body beneath the window.

The back door body usually is composed of two panel members, namely an outer panel and an inner panel. From the standpoint of design considerations, the outer panel, which forms the outer surface of the back door body, should readily lend itself to any change in shape or styling. Various art has heretofore been proposed for this purpose, an example of which is disclosed in the specification of Japanese Utility Model Application Laid-Open (KOKAI) No. 56-31917. In the art disclosed, the outer panel is divided into at least upper and lower portions. These upper and lower portions are joined in a state where an edge portion of one overlaps a corresponding edge portion of the other. Thus, the conventional back door body is of a so-called "divided" structure. This divided structure is adopted instead of one in which the outer panel is constituted by a single panel member because the latter cannot be freely modified in shape and styling due to machining considerations.

This conventional divided structure has the following problems relating to the location at which the outer panel is divided into the upper and lower panels:

(1) If the outer panel is divided through the portion of the window opening formed in the upper panel, the upper panel will have insufficient rigidity before it is joined to the lower panel. This means that it is necessary to enlarge the thickness of the plate forming the upper panel.

(2) The portion where the two panels are joined together forms a portion of the window glass fixing surface. This makes it necessary to join the two panels together with a high accuracy. If the joint is insufficiently accurate, a sealer covering the joint will crack and allow water to leak into the car body.

(3) If the outer panel is divided below the window opening, on the other hand, the joint will be exposed to external view and will require to be covered by the mounting of finisher or the like. This increases the number of assembly steps and component parts and results in higher production cost.

SUMMARY OF THE INVENTION

An object of the present invention is to provide an automobile back door structure wherein the location at which the outer panel of the back door body is divided is appropriately set while taking the mounting of the window glass into consideration, thus assuring satisfactory rigidity of the divided panels before joining without increasing the thickness of the panel plates, as well as providing an excellent seal at the joint, improved economy and an attractive appearance.

According to the present invention, the foregoing object is attained by providing an automobile back door structure comprising a back door body formed to include a rear window opening and pivotally attached to the rear portion of an automobile body so as to open an opening formed in said rear portion, and a window glass fixedly mounted on the back door body so as to close the rear window opening. The back door body includes an outer panel defining an outer surface of the back door body, and an inner panel defining an inner surface of the back door body. The outer and inner panels are joined to each other in a state where their outer peripheries and the rear window opening meet. The outer panel includes an upper portion having the rear window opening formed at the approximate center thereof and including an outer surface on which the window glass is fixedly secured, and a lower portion joined to the upper portion at a lower part thereof and formed to include a recess at the approximate center thereof.

In accordance with the invention, the abovedescribed construction of the back door is such that the upper portion of the outer panel is of a generally frame-shaped configuration having the rear window opening at its center. The upper portion therefore has satisfactory rigidity without requiring any particular increase in plate thickness. As a result, the upper portion of the outer panel will not be deformed as during shipment before it and the lower portion and inner panel are assembled into a whole.

The joint between the upper and lower portions of the outer panel is situated below the window opening of the upper portion near the upper edge of the recess formed in the lower portion but positionally offset from the seal bonding the window glass. Accordingly, an excellent seal can be provided between the window glass and the upper portion of the outer panel irrespective of the precision of the joint between the upper and lower portions.

Furthermore, the lower edge of the window glass extends below the upper edge portion of the recess formed in the lower portion of the outer panel, namely below the joint between the upper and lower portions of the outer panel. As a result, the joint is concealed by mounting the window glass, so that the overall appearance is improved without requiring special fittings or work for joint concealing purposes.

Other features and advantages of the present invention will be apparent from the following description taken in conjunction with the accompanying drawings, in which like reference characters designate the same or similar parts throughout the figures thereof.

DESCRIPTION OF THE PREFERRED EMBODIMENT

Figure 1:
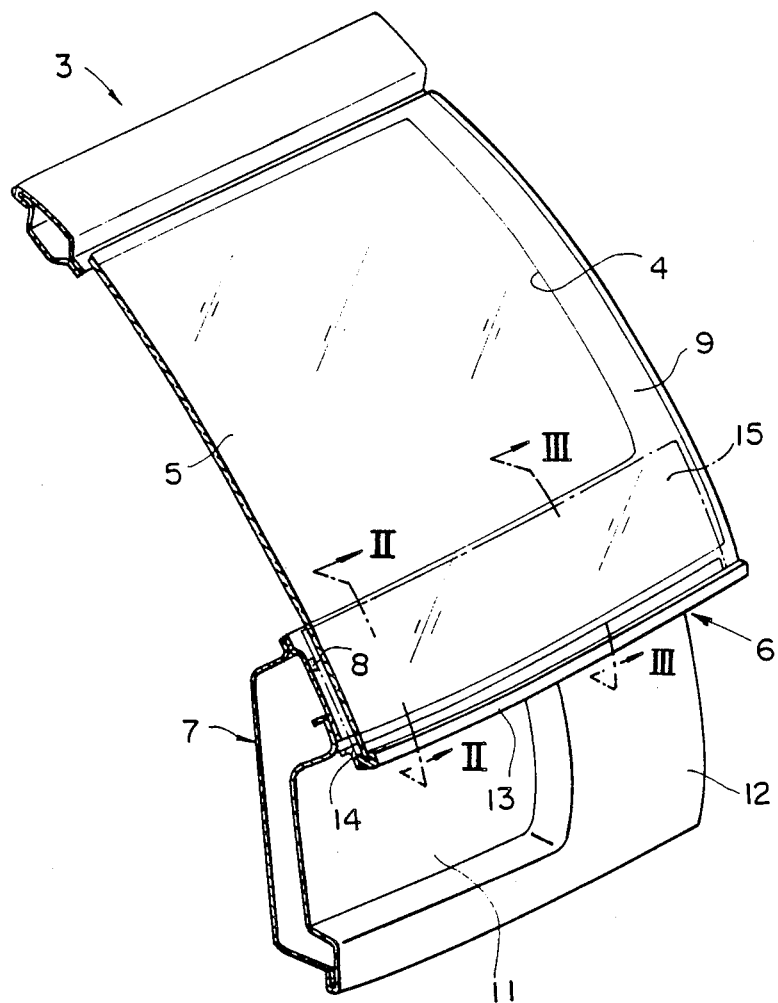
FIG. 1 is a perspective view illustrating an embodiment of an automobile back door structure according to the present invention.

An embodiment of an automobile back door structure according to the present invention will now be described in detail in accordance with the present invention.

FIGS. 1 through 4 illustrate an automobile back door structure embodying the present invention. An automobile body indicated at numeral 1 has an open rear on which a back door 2 is pivotally hinged at its upper edge. The back door 2 has a back door body 3 in the upper portion of which a window opening 4 is formed, and a window glass 5 mounted to cover the opening 4 from its outer side. The back door body 3 is constituted by an outer panel 6 forming the outer surface of the back door body, and an inner panel 7 forming the inner surface of the back door body. The inner and outer panels 6, 7 are joined together at positions where their outer peripheries and the opening 4 meet.

Figure 2:
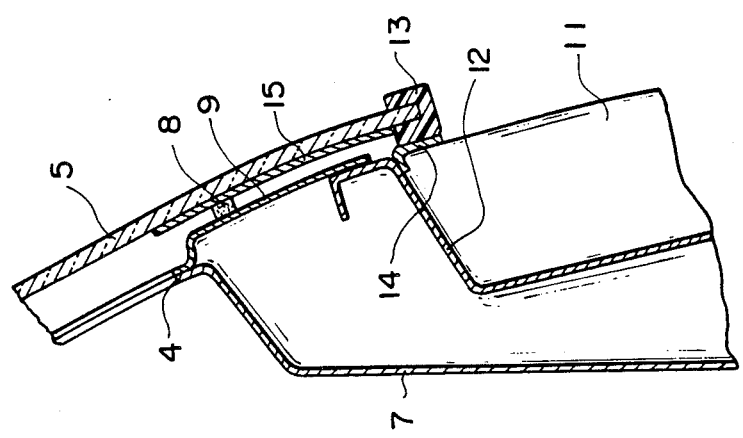
Figure 4:
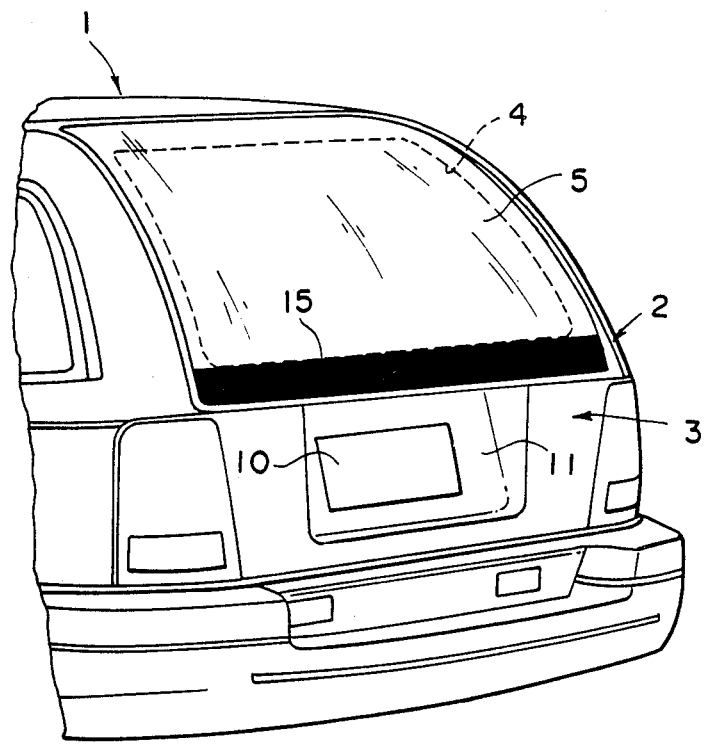
FIG. 4 is a perspective view illustrating the environment of the mounted back door.

The outer panel 6 comprises an upper portion 9 having a frame-shaped configuration with the window opening 4 formed at its central portion, and a lower portion 12 the central portion of which is formed to include a recess 11 for receiving a license plate 10 or the like. The window glass 5 is mounted via an adhesive 8 on the outer surface of the upper portion 9 so as to close the window opening 4. The lower part of the upper portion 9 and the upper part of the lower portion 12 are overlapped and joined over their entire length transversely of the automobile body immediately above the upper edge portion of the recess 11, as shown in FIG. 2. A lower part of the upper portion 9 which supports a lower part of the window glass 5 is substantially planar. Also, the lower part of the lower portion 12 is coupled to a lower part of the inner panel 7 so as to define a substantially closed configuration as seen in FIG. 1.

The arrangement is such that the two side edges of the window glass 5 coincide with corresponding ones of the side edges of the upper portion 9 of the outer panel 6. The lower edge of the window glass 5 extends, over its entire length transversely of the vehicle body, below the upper edge portion of the recess 11. Thus, the lower side portion of window glass 5 corresponding to the recess 11 is set in a state where it overhangs the upper side of the recess 11. The remaining lower side portion of window glass 5 corresponding to that part of lower portion 12 not having the recess 11, namely the portion of the window glass 5 on both sides of the portion overhanging the recess 11, is situated on part of the lower portion 12, as illustrated in FIG. 3.

A synthetic resin molding 13 is fitted snugly onto the entire periphery of the lower edge of the window glass 5 to protect the same. In order to support the lower edge portion of window glass 5 that overhangs the recess 11, this lower edge portion is connected at its inner surface to the peripheral portion of the recess 11 of lower portion 12 by a supportion member 14. That portion of the lower edge of window glass 5 that does not overhang the recess 11 is abutted against the outer surface of the lower portion 12, as shown in FIG. 3. This portion of the lower edge of window glass 5 therefore does not need to be supported by a separate supporting member.

It should be noted that the supporting member 14 is necessary only if the lower portion of window glass 5 that overhangs the recess 11 does so to a great extent. The supporting member therefore is not an essential element for working the present invention.

Figure 3:
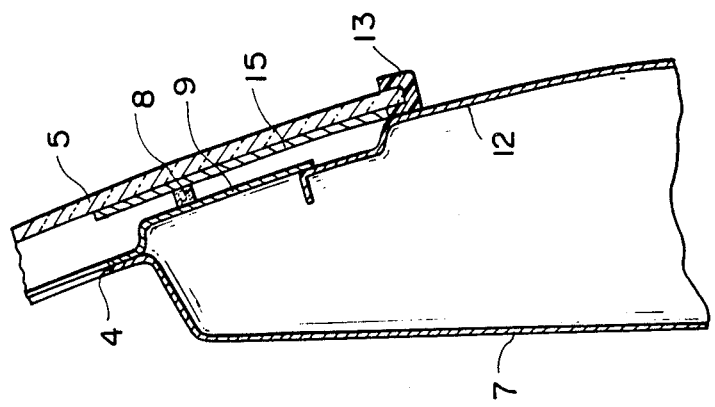
FIGS. 2 and 3 are enlarged sectional views taken respectively along lines II—II and III—III of FIG. 1 and showing a window glass in a mounted state.

Further, as shown in FIGS. 2 and 3, a nontransparent ceramic sheet 15 is affixed to the inner surface of the window glass 5 at its lower portion, namely at the portion corresponding to that part of upper portion 9 below the opening 4, in order to conceal the joint between the upper and lower portions 9, 12 of the outer panel 6 for the sake of improving appearance. The ceramic sheet 15 also functions to conceal the adhesive 8 between the window glass 5 and upper portion 9 of outer panel 6. The ceramic sheet 15 preferably is black in color so that the lower portion of window glass 15 on the rear side will appear black. This accentuates the beauty of the vehicle body 1 as seen from the rear.

Thus, in accordance with the illustrated embodiment as described in detail above, the upper portion 9 of outer panel 6 is of a generally frameshaped configuration having the window opening 4 at its center. As a result, the upper portion has the required rigidity without necessitating any particular increase in plate thickness. Thus, the upper portion 9 of the outer panel 6 will not be deformed, even by a certain degree of rough handling, as during shipment before it and the lower portion 12 and inner panel 7 are assembled into a whole. This enhances handling ease during shipment.

Further, the joint between upper portion 9 and lower portion 12 of the outer panel 6 is situated below the window opening 4 of the upper portion 9 near the upper edge of the recess 11 formed in the lower portion 12. In other words, the joint is positionally offset from the adhesive seal surface of window glass 5 (i.e. from the peripheral portion, as indicated by numeral 8, of the window opening 4 of upper portion 9). Thus, an excellent seal can be provided between the window glass 5 and the upper portion 9 of the outer panel 6 irrespective of the precision of the joint between the upper and lower portions.

In addition, the lower edge of the window glass 5 extends below the upper edge portion of the recess 11 formed in the lower portion 12 of the outer panel 6, namely below the joint between the upper and lower portions 9, 12 of the outer panel 6. As a result, the joint is concealed by mounting the window glass 5, so that the overall appearance is improved without requiring special fittings or work for joint concealing purposes.

Thus, as described in detail above, an automobile back door structure in accordance with the present invention comprises a back door body formed to include a rear window opening and pivotally attached to the rear portion of an automobile body so as to open an opening formed in said rear portion, and a window glass fixedly mounted on the back door body so as to close the rear window opening. The back door body includes an outer panel defining an outer surface of the back door body, and an inner panel defining an inner surface of the back door body. The outer and inner panels are joined to each other in a state where their outer peripheries and the periphery of the rear window opening overlap. The outer panel includes an upper portion having the rear window opening formed at the approximate center thereof and including an outer surface on which the window glass is fixedly secured, and a lower portion joined to the upper portion at a lower part thereof and formed to include a recess at the approximate center thereof.

Therefore, in accordance with the invention, the upper portion of the outer panel has sufficient rigidity before assembly without requiring an increase in the plate thickness. Moreover, an excellent seal is achieved between the window glass and outer panel regardless of the precision with which the upper and lower portions are joined together. In addition, extra work and component parts are not required to conceal the joint. This enables appearance to be improved without raising production cost.

As many apparently widely different embodiments of the present invention can be made without departing from the spirit and scope thereof, it is to be understood that the invention is not limited to the specific embodiments thereof except an defined in the appended claims.

What is claimed is:

1. An automobile back door structure comprising:
a back door body including a rear window opening and adapted to be pivotally attached to a rear portion of an automobile body so as to open an opening formed in said rear portion, and
a window glass fixedly mounted on said back door body so as to close the rear window opening, said back door body including:
an outer panel defining an outer surface of said back door body,
an inner panel defining an inner surface of said back door body,
said outer and inner panels being joined to each other at a lower edge of the window opening,
said outer panel including:
an upper portion having the rear window opening formed at an apporximate center thereof, and including an outer surface on which said window glass is adapted to be fixedly secured, and
a lower part of the upper portion which supports a lower part of the window glass and extends widthwise across the automobile body being substantially planar, and
a lower portion joined to said lower part of the upper portion at a joint located below the window opening when said window glass is positioned substantially vertically and said lower portion having a recess at the approximate center thereof, a lower part of the lower portion being coupled to a lower part of the inner panel, thereby defining a substantially closed configuration.

2. The back door structure according to claim 1, wherein said window glass is provided on said upper portion over the entire width of the automobile body.

3. The back door structure according to claim 2, wherein said joint is an overlapping joint over the entire width of the automobile body on the upper side of the recess near an upper edge portion of said recess.

4. The back door structure according to claim 3, wherein said joint is covered by said window glass.

5. The back door structure according to claim 4, wherein said joint is disposed below a bond fixing said window glass to said upper portion.

6. The back door structure according to claim 2, wherein said window glass has a lower edge situated below an upper edge portion of said recess over a portion of the entire width of the vehicle body.

7. The back door structure according to claim 6, wherein the lower edge of said window glass overhangs the recess at a portion thereof corresponding to said recess.

8. The back door structure according to claim 5, wherein said window glass has a lower edge situated below an upper edge portion of said recess over a portion of the entire width of the vehicle body.

9. The back door structure according to claim 8, wherein the lower edge of said window glass overhangs the recess at a portion thereof corresponding to said recess.

10. An automobile back door structure comprising:
a back door body including a rear window opening and adapted to be pivotally attached to a rear portion of an automobile body so as to open an opening formed in said rear portion,
a window glass fixedly mounted on said back door body so as to close the rear window opening,
said back door body including:
an outer panel defining an outer surface of said back door body, and
an inner panel defining an inner surface of said back door body,
said outer and inner panels being joined to each other,
said outer panel including:
an upper portion having the rear window opening formed at an approximate center of the upper portion, said upper portion including an outer surface on which said window glass is adapted to be fixedly secured, and
a lower portion joined to said upper portion at a lower part of said outer panel, said lower portion including a recess at an approximate center of the lower portion,
said upper and lower portions being joined at a joint in an overlapping manner over substantially the entire width of the automobile body between an upper edge portion of said recess and said opening,
said back door structure further comprising:
a member for covering the joint over substantially the entire width of the automobile body,
said member being located between the joint and the window glass and said joint being covered by said window glass.

11. The automobile back door structure according to claim 10, wherein said member is formed of a non-transparent ceramic sheet.

12. An automobile back door structure comprising:
a back door body having a rear window opening, said back door body being adapted to fixedly receive a window glass so as to close the rear window opening,
said back door body including:
an outer panel defining an outer surface of said back door body,
an inner panel defining an inner surface of said back door body,
said inner and outer panels being joined to each other,
said outer panel including:
an upper portion having the rear window opening formed therein and having an outer surface which is adapted to receive said window glass,
a lower portion joined to said upper portion at a joint, said joint being located at a position below the rear window opening when the back door body is positioned substantially vertically.

* * * * *